United States Patent [19]

Matta et al.

[11] Patent Number: 5,877,253

[45] Date of Patent: Mar. 2, 1999

[54] METHOD OF PREPARING INORGANIC PIGMENT DISPERSIONS

[75] Inventors: Bruce L. Matta, Emmaus; Samuel A. Firman, Ambler; George A. Smith, Newtown, all of Pa.; Reuben H. Grinstein, Tucson, Ariz.

[73] Assignee: Henkel Corporation, Gulph Mills, Pa.

[21] Appl. No.: 670,969

[22] Filed: Jun. 26, 1996

Related U.S. Application Data

[60] Provisional application No. 60/017,841, Jun. 26, 1995.
[51] Int. Cl.$^6$ ..................................................... C08L 31/00
[52] U.S. Cl. ............................................................ 524/556
[58] Field of Search ............................................. 524/556

[56] References Cited

U.S. PATENT DOCUMENTS 4,243,430   1/1981   Sperry et al. ...................... 106/308 M

*Primary Examiner*—Edward J. Cain
*Attorney, Agent, or Firm*—Henry E. Millson, Jr.; Glenn E. J. Murphy; John D. Wood

[57] ABSTRACT

A method of preparing an inorganic pigment dispersion useful in the preparation of latex paints is provided. The method comprises dispersing an inorganic pigment in an aqueous medium further comprised of a dispersing polymer, said aqueous medium being essentially free of volatile organic solvents. The dispersing polymer is derived from monomers consisting essentially of an ethylenically unsaturated aromatic monomer having an unsubstituted ethylenic group, an ethylenically unsaturated aromatic monomer having an alkyl-substituted ethylenic group, and an ethylenically unsaturated acid monomer. The amount of the ethylenically unsaturated acid monomer is sufficient to permit the dispersing polymer to associate with an inorganic pigment in an aqueous medium in a manner which disperses the inorganic pigment in the aqueous medium to form a stable aqueous dispersion of said inorganic pigment. The total amount of the ethylenically unsaturated aromatic monomers is sufficient to reduce the water sensitivity of a dried coating of a latex paint comprised of said stable aqueous dispersion of said inorganic pigment. Use of the inorganic pigment dispersions to prepare latex paints, and latex paints resulting from such use, are also provided.

69 Claims, No Drawings

METHOD OF PREPARING INORGANIC PIGMENT DISPERSIONS

CROSS-REFERENCE TO RELATED APPLICATIONS

This application claims priority from U.S. provisional application Ser. No. 60/017,841, filed Jun. 26, 1995, the disclosure of which provisional application is incorporated herein by reference.

FIELD OF THE INVENTION

The present invention relates to methods of preparing inorganic pigment dispersions useful in the manufacture of latex paints, and latex paints prepared therewith.

BACKGROUND OF THE INVENTION

Paint coatings are protective surface coatings applied to substrates and cured to form dry continuous films for decorative purposes as well as to protect the substrate. Consumer latex paint coatings are air-drying aqueous coatings applied primarily to architectural interior or exterior surfaces, where the coatings are sufficiently fluid to flow out, form a continuous paint film, and then dry at ambient temperatures to form continuous films.

A paint coating is ordinarily comprised of an organic polymeric binder, pigments, and various paint additives. The polymeric binder acts as a fluid vehicle for the pigments and imparts Theological properties to the fluid paint coating. In dried paint films, the polymeric binder functions as a binder for the pigments and provides adhesion of the dried paint film to the substrate. The pigments may be organic or inorganic and functionally contribute to opacity and color in addition to durability and hardness.

The manufacture of paint coatings involves the preparation of a polymeric binder, mixing of component materials, grinding of pigment in the presence of a pigment dispersant, mixing the pigment grind with the polymeric binder, and thinning to commercial standards. High speed dispersers or dissolvers are used in the grinding step to disperse the pigments into the polymeric binder solution.

Considerable research effort has been directed toward eliminating volatile organic compounds (VOC) from consumer paints and especially from latex paints to eliminate emission problems as well as the odor problems. (VOC is a measure of volatile organic compounds in a paint composition according to U.S. EPA Rule 24. See also ASTM Manual Series MNL4 and ASTM D-3960 and ASTM D-2369-87.) Thus, an urgent need exists to eliminate consumer VOC problems with air drying paints.

Polyacrylic acid in its neutralized form has been used to prepare aqueous pigment dispersions, particularly dispersions of titanium dioxide. Polyacrylic acid disperses the pigment well and contributes little, if at all, to the VOC of the latex paint into which the pigment dispersion is incorporated. However, polyacrylic acid also tends to contribute to water sensitivity of the dried paint coating. For example, an exterior paint coating is more susceptible to water damage as a result of precipitation and an interior paint coating may be damaged when scrubbed with aqueous liquids, e.g. soap and water. A pigment dispersant with a reduced contribution to the water sensitivity of the dried paint coating is therefore desirable.

SUMMARY OF THE INVENTION

This invention relates to a method of preparing an inorganic pigment dispersion useful in the preparation of latex paints, said method comprising dispersing an inorganic pigment in an aqueous medium further comprised of a dispersing polymer, said aqueous medium being essentially free of volatile organic solvents, and said dispersing polymer being derived from monomers consisting essentially of an ethylenically unsaturated aromatic monomer having an unsubstituted ethylenic group, an ethylenically unsaturated aromatic monomer having an alkyl-substituted ethylenic group, and an ethylenically unsaturated acid monomer, wherein the amount of said ethylenically unsaturated acid monomer is sufficient to permit said polymer to associate with an inorganic pigment in an aqueous medium in a manner which disperses said inorganic pigment in said aqueous medium to form a stable aqueous dispersion of said inorganic pigment, and wherein the total amount of said ethylenically unsaturated aromatic monomers is sufficient to reduce the water sensitivity of a dried coating of a latex paint comprised of said stable aqueous dispersion of said inorganic pigment. This invention also relates to an inorganic pigment dispersion comprising an inorganic pigment and a dispersing polymer as described above in an aqueous medium.

This invention also relates to latex paints comprising the inorganic pigment dispersion composition of this invention and to a method of coating a substrate comprising contacting a surface of a substrate with a composition comprising a latex paint binder and an inorganic pigment dispersion of this invention and drying said surface to form a film of said composition in contact with said surface. With respect to certain embodiments, this invention relates to a method of dispersing an inorganic pigment with a polymer produced by the process of polymerizing monomers consisting essentially of:

(i) an aromatic monomer having the formula $CH_2=C(R^1)(R^2)$ wherein $R^1$ is an aromatic group having from 6 to 10 carbon atoms, and $R^2$ is hydrogen, (ii) an aromatic monomer having the formula $CH_2=C(R^3)(R^4)$ wherein $R^3$ is an aromatic group having from 6 to 10 carbon atoms, and $R^4$ is lower (e.g. $C_1–C_4$) alkyl, preferably methyl, and (iii) an acid monomer having the formula $CH_2=C(C(O)OH)(R^5)$ wherein $R^5$ is hydrogen or methyl, or mixtures thereof.

In typical embodiments, the monomers consist essentially of one or more of said aromatic monomers having an unsubstituted ethylenic group in an amount of from about 20% to about 40% by weight, one or more of said aromatic monomers having an alkyl-substituted ethylenic group in an amount of from about 30% to about 50% by weight, and one or more of said acid monomers in an amount of from about 20% to about 40% by weight. Preferred polymers are based on styrene as the aromatic monomer with an unsubstituted ethylenic group, alpha-methylstyrene as the aromatic monomer with an alkyl-substituted ethylenic group and acrylic acid as the acid monomer. The polymer typically has a molecular weight (e.g. weight average) of from about 1,000 to about 20,000.

DETAILED DESCRIPTION OF THE INVENTION

In certain aspects, this invention relates to the use of the polymers to disperse an inorganic pigment in an aqueous medium and to the resulting dispersions. In still other aspects, this invention also relates to latex paint compositions comprised of a latex paint binder and an inorganic pigment dispersion of this invention and to a method of coating a substrate which employs such latex paint compositions. Each of these aspects will be addressed in turn below.

The polymers useful in this invention can be generally characterized as terpolymers, i.e. they have repeating units derived from at least three different monomers: an aromatic monomer having an unsubstituted ethylenic group, an aromatic monomer having an alkyl-substituted ethylenic group, and an acid monomer. Thus, the starting materials for preparing these polymers of this invention are an ethylenically unsaturated aromatic compound wherein the ethylenic group is unsubstituted, an ethylenically unsaturated aromatic compound wherein the ethylenic group bears an alkyl group as a substituent, and an ethylenically unsaturated acid compound.

The monomeric unit A is derived from an ethylenically unsaturated aromatic compound an ethylenically unsaturated aromatic compound wherein the ethylenic group is unsubstituted. Examples of the ethylenically unsaturated aromatic compounds include monovinyl aromatic hydrocarbons containing from 8 to 12 carbon atoms and halogenated derivatives thereof having halo-substituted aromatic moieties. Specific examples include styrene, vinyl toluene (e.g. a 60/40 mixture by weight of meta-methylstyrene and para-methylstyrene), meta-methylstyrene, para-methylstyrene, para-ethylstyrene, para-n-propylstyrene, para-isopropylstyrene, para-tert-butylstyrene, ortho-chlorostyrene, para-chlorostyrene, and tert-butyl styrene. Certain vinyl aromatic compounds are discussed in "Styrene Polymers", *Encyclopedia of Polymer Science and Engineering*, vol. 16, pp. 1–21 (John Wiley & Sons, Inc., New York, N.Y., 1989), the disclosure of which is incorporated by reference herein.

The monomeric unit B is derived from an ethylenically unsaturated aromatic compound wherein one of the carbon atoms which make up ethylenic unsaturation bears an alkyl group. Examples of such compounds include alpha-methylstyrene, alpha-methyl-meta-methylstyrene, alpha-methyl-para-methylstyrene, alpha-methyl-ortho-chlorostyrene, alpha-methyl-para-chlorostyrene, alpha-ethylstyrene, alpha-ethyl-meta-methylstyrene, alpha-ethyl-para-methylstyrene, alpha-ethyl-ortho-chlorostyrene, alpha-ethyl-para-chlorostyrene, beta-methylstyrene, beta-methyl-meta-methylstyrene, beta-methyl-para-methylstyrene, beta-methyl-ortho-chlorostyrene, beta-methyl-para-chlorostyrene, beta-ethylstyrene, beta-ethyl-meta-methylstyrene, beta-ethyl-para-methylstyrene, beta-ethyl-ortho-chlorostyrene, and beta-ethyl-para-chlorostyrene.

The monomeric unit C is derived from an ethylenically unsaturated acid monomer. Examples of alpha, beta-ethylenically unsaturated carboxylic acids which may also be useful as comonomers to prepare the polymer of the invention include acrylic acid, beta-acryloxypropionic acid and higher oligomers of acrylic acid and mixtures thereof, methacrylic acid, itaconic acid, aconitic acid, crotonic acid, citraconic acid, maleic acid, fumaric acid, alpha-chloroacrylic acid, cinnamic acid, mesaconic acid and mixtures thereof. Preferred examples are acrylic acid and methacrylic acid. Such acids are described in "Acrylic and Methacrylic Acid Polymers", *Encyclopedia of Polymer Science and Engineering*, vol. 1, pp. 211–234 (John Wiley & Sons, Inc., New York, N.Y., 1985), the disclosure of which is incorporated herein by reference.

Further examples of acid monomers that may be useful include the partial esters of unsaturated aliphatic dicarboxylic acids and particularly the alkyl half esters of such acids.

Examples of such partial esters are the alkyl half esters of itaconic acid, fumaric acid and maleic acid wherein the alkyl group contains 1 to 6 carbon atoms. Representative members of this group of compounds include methyl acid itaconic, butyl acid itaconic, ethyl acid fumarate, butyl acid fumarate, and methyl acid maleate. These acid monomers generally have greater molecular bulk than the preferred monomer, acrylic acid, and thus, may have less hydrophilic character than the preferrred monomer, acrylic acid. Thus, the use of such acid functional partial esters as the acid monomer may allow one to reduce the relative amount of aromatic monomer and yet obtain the same reduction in water sensitivity.

It is the acid groups of the C monomeric unit that are responsible for the ability of the polymer to associate with an inorganic pigment and, thus, stably disperse the inorganic pigment in an aqueous medium. It is the aromatic groups of the A and B monomeric units that are believed to be responsible for the reduced water sensitivity of a latex paint prepared from the inorganic pigment dispersion. The polymer should form a stable pigment dispersion, but also have reduced water sensitivity.

Therefore, the relative amounts of the C monomeric unit on the one hand and the A and B monomeric units on the other hand should be adjusted to obtain the desired degrees of stability of the pigment dispersion and the desired reduction in water sensitivity of a latex paint prepared therewith. The amount of the A monomeric unit will generally be a minor amount, e.g. from about 20% to about 40% by weight of the polymer, preferably from about 25% to about 35%. The amount of the B monomeric unit will typically be a minor amount, e.g. from about 30% to about 50% by weight of the polymer, more typically from about 35% to about 45%. The amount of the C monomeric unit will typically be a minor amount, e.g. from about 20% to about 40% by weight of the polymer, more typically from about 25% to about 35%. However, the precise characteristics desired of the aqueous pigment dispersion and the latex paint prepared therefrom will influence the determination of what is an optimal amount of the C monomeric units on the one hand and the A and B monomeric units on the other, the precise identity of each monomer and the amount of each monomer affecting, as discussed herein, properties of the polymer which are important to its utility as an inorganic pigment dispersant.

While the preferred dispersing polymers are prepared without additional comonomers, other monoethylenically unsaturated polymerizable monomers useful in minor proportion (e.g. less than 10% by weight of the total monomer composition) as comonomers with the aromatic and acid monomers may be useful in preparing the polymers of this invention. Examples of other monomers include the vinylidene halides, vinyl halides, acrylonitrile, methacrylonitrile, vinyl esters such as vinyl formate, vinyl acetate and vinyl propionate, and mixtures of ethylene and such vinyl esters, acrylic and methacrylic acid esters of alcohol ethers such as diethylene glycol monoethyl or monobutyl ether methacrylate, $C_1$–$C_{10}$ alkyl esters of beta-acryloxypropionic acid and higher oligomers of acrylic acid, mixtures of ethylene and other alkylolefins such as propylene, butylene, pentene and the like, vinyl ethers such as methyl vinyl ether, ethyl vinyl ether, vinyl 2-methoxyethyl ether, vinyl 2-chloroethyl ether and the like, hydroxy functional vinyl monomers such as 2-hydroxyethyl methacrylate, 2-hydroxyethyl acrylate, 3-hydroxypropyl methacrylate, butanediol acrylate, 3-chloro-2-hydroxypropyl acrylate, 2-hydroxypropyl acrylate, and 2-hydroxypropyl methacrylate.

In addition to mono-ethylenically unsaturated monomers, the monomers from which the polymer is prepared may also be comprised of an ethylenically unsaturated monomer having at least two sites of ethylenic unsaturation, i.e. a di- or higher multi-ethylenically unsaturated monomer. Examples of multiethylenic monomers include alkenyl acrylates or methacrylates (e.g. allyl methacrylate), di-alkenyl arenes, particularly di-alkenyl benzenes (e.g. divinyl benzene), di-alkenyl ethers (e.g. ethylene glycol di-allyl ether and pentaerythritol di-allyl ether), di-acrylamides (e.g. methylene-bis-acrylamide, trimethylene-bis-acrylamide, hexamethylene-bis-acrylamide, N,N'diacryloylpiperazine, m-phenylene-bis-acrylamide, and p-phenylene-bisacrylamide), di- or higher multi-acrylates (e.g. diethylene glycol diacrylate, propylene glycol dimethacrylate, ethylene glycol dimethacrylate, polyethylene glycol diacrylate, bis(4-acryloxypolyethoxyphenyl)-propane, 1,3-butylene glycol dimethacrylate, 1,5-pentanediol diacrylate, neopentyl glycol diacrylate, 1,6-hexanediol diacrylate, and polypropylene glycol diacrylate, pentaerythritol triacrylate, trimethylolpropane triacrylate, trimethylolpropane trimethacrylate, pentaerythritol tetraacrylate, triethylene glycol, and dimethacrylate). Such multifunctional monomers may be useful as crosslinking agents to modifying the molecular weight of the polymer and improve the paint film's water resistant properties. The amount of the multiethylenic monomers will be a minor amount, typically from about 0.1% to about 3% by weight of total monomers, because the polymer should not be so highly crosslinked that it is rendered insoluble.

While it is thus conceivable that the polymer will contain monomeric units derived from monomers other than the aromatic monomer and the acid monomer, in preferred embodiments, the polymer is prepared by polymerization of monomers consisting of:

(a) from about 10% to about 60%, more typically from about 20% to about 40%, and preferably from about 25% to about 35%, by weight based on the total weight of monomers, of an ethylenically unsaturated aromatic monomer having less than twelve carbon atoms and an unsubstituted ethylenic unsaturation, said monomer preferably being styrene, (b) from about 20% to about 70%, more typically from about 30% to about 50%, and preferably from about 35% to about 45%, by weight based on the total weight of monomers, of an ethylenically unsaturated aromatic monomer having less than twelve carbon atoms and an alkyl-substituted ethylenic unsaturation, said monomer preferably being alpha-methyl styrene, and (c) from about 10% to about 60%, more typically from about 20% to about 40%, and preferably from about 25% to about 35%, by weight based on the total weight of monomers of an ethylenically unsaturated carboxylic acid having less than six carbon atoms, preferably acrylic acid and/or methacrylic acid.

In general, the polymer will have a molecular weight (e.g. weight average) of from about 1,000 to about 20,000, typically from about 1,500 to about 10,000, and more typically from about 2,000 to about 8,500. The acid value (expressed as mg of KOH per gram of polymer) of the polymer should be less than about 250, typically about 110 to about 240, more typically from about 190 to about 220. These typical acid values are based on polymers in which acrylic acid is the acid monomer and the acid value of other polymers, given the same mole ratio of acid monomer to other monomers will depend, of course, on the molecular weight of the particular acid monomer used.

Inorganic Pigment Dispersions

In one aspect, this invention relates to a method of preparing a pigment dispersion useful in the preparation of latex paints. The method in its broadest conception comprises dispersing a pigment in an aqueous medium further comprised of a dispersing polymer, said aqueous medium being essentially free of volatile organic solvents. While the acid monomer which forms part of the dispersing polymer will typically be in the free acid form during the solution polymerization, the aqueous medium in which the inorganic pigment is to be dispersed will typically have a neutral, or even alkaline, pH such that the monomeric unit derived from the acid monomer will typically be in the form of a charged anion, e.g. carboxylate.

The dispersing polymers of this invention form the pigment dispersions of this invention when dissolved in an aqueous solvent containing ammonia or an organic amine. The polymer is typically added to the solvent in an amount of about 20–40% polymer solids based on the weight of the solvent. Typically, the aqueous solvent will contain only ammonia to avoid any contribution to the volatile organic content of the pigment dispersion, but examples of suitable organic amines that can be used in place of or with ammonia include primary, secondary, and tertiary amines which can act as a base to salt polymer. Specific examples of organic amines are the dialkyl aminoalkanols such as 2-(N,N-dimethylamino)ethanol and 2-(N,N-diethylamino)ethanol.

The ammonia or organic amine is present in the aqueous solution in an amount sufficient to solubilize the dispersing polymer. In general, the ammonia or organic amine will be present in the aqueous solution in an amount sufficient to theoretically neutralize the acid groups of the polymer, i.e., the amount of ammonia or organic amine is stoichiometrically equivalent to or greater than the acid value of the polymer. A large excess of organic amine should be avoided because retention of the organic amine in the dried paint coating may adversely affect the water resistance of the coating.

The amount of the acid monomer used to prepare the dispersing polymer should be sufficient in relation to the amount of the aromatic monomer to yield a polymer that is sufficiently capable of associating with the inorganic pigment such that a stable pigment dispersion is formed. If the polymer is not sufficiently capable of associating with the inorganic pigment, observable precipitation of the pigment during the intended shelf life of the pigment dispersion or the latex paint prepared therewith may occur.

The pigment dispersion is typically made by first dissolving the dispersing polymer in water. The dispersion will typically be essentially free of organic solvents, e.g. alcohol solvents such as the short chain aliphatic alcohols having from 2 to 4 carbon atoms, e.g. the lower alkanols, ethanol, n-propanol, isopropanol and n-butanol. These solvents can contribute to the volatile organic content (a.k.a. VOC) of the dispersion and any paint prepared therefrom, which has environmental disadvantages.

One of the ingredients of the pigment dispersions of this invention is an inorganic pigment or colorant. The generic term pigment includes both colorant pigments and opacifying pigments. The term "colorant pigment" is specifically used in this specification to refer to both pigments and dyes which impart a distinct color (i.e. a hue as opposed to white (the absence of color) or black and/or shades of gray) to the composition.

The pigment of the dispersion may be a colorant pigment, i.e. the pigment will impart a color to the pigment dispersion, to a printing ink prepared therefrom, and to the surface of a substrate printed with such a printing ink. The colorant pigments useful in this invention will typically include black, inorganic red, inorganic yellow, as well as violet, orange, green, and brown. Useful pigments include for instance ferrite yellow oxide, red iron oxides, ferric iron oxide brown (which is a blend of red, yellow, and black iron oxides), tan oxide (which is a similar blend), raw sienna and burnt sienna, raw and burnt umber, carbon black, lampblack.

The inorganic pigment will typically, however, be an opacifying pigment. For purposes of this invention, white opacifying pigments are not considered to be colorant pigments. Opacifying pigments are generally pigments having a refractive index of at least about 1.8. Typical white opacifying pigments include rutile and anatase titanium dioxide. The dispersions may contain non-opacifying filler or extender pigments often referred to in the art as inerts and include clays, such as kaolinite clays, silica, talc, mica, barytes, calcium carbonate, and other conventional filler pigments. All filler or extender pigments have fairly low refractive indices and can be described generally as pigments other than opacifying pigments.

The pigment dispersions of this invention may be prepared as follows. The pigment is mixed with an aqueous solution of the dispersing polymer and, at a properly adjusted viscosity, dispersed thereinto with a ball mill, sand mill, high-shear fluid flow mill, Cowles Dissolver, Katy Mill or the like. The process of dispersing causes agglomerates of the pigment particles to deagglomerate and the dispersing polymer causes the deagglomerated particles of pigment to be wetted with the aqueous solution. This wetting thus inhibits the reagglomeration of the pigment particles.

The pigment dispersion will typically be characterized as a slurry of the pigment in an aqueous medium which also contains a minor amount of the dispersing polymer. Typically, the weight ratio of inorganic pigment to aqueous medium is from about 1:1 to about 10:1, more typically from about 1.5:1 to about 5:1, and even more typically from about 2:1 to about 4:1. The weight ratio of inorganic pigment to dispersing polymer on a solid basis is typically from about 10:1 to about 1000:1, more typically from about 50:1 to about 500:1, and even more typically from about 75:1 to about 150:1.

Latex Paint Compositions

The invention includes latex paint compositions containing an emulsion or dispersion of a water-insoluble polymer and a pigment dispersion of the invention. The water-insoluble polymers may be any of the types conventionally utilized in latex paint compositions and include natural rubber latex ingredients and synthetic latices wherein the water-insoluble polymer is an emulsion polymer of mono- or poly-ethylenically unsaturated olefinic, vinyl or acrylic monomer types, including homopolymers and copolymers of such monomers. Latices and latex paints are discussed extensively in "Latices", *Encyclopedia of Polymer Science and Engineering*, vol. 8, pp. 647–677 (John Wiley & Sons, Inc., New York, N.Y., 1987), and "Coatings", *Encyclopedia of Polymer Science and Engineering*, vol. 3, pp. 615–675 (John Wiley & Sons, Inc., New York, N.Y., 1985), the disclosures of which are incorporated herein by reference.

Specifically, the water-insoluble emulsion polymer may include poly (vinyl acetate) and copolymers of vinyl acetate (preferably at least 50% by weight) with one or more of vinyl chloride, vinylidene chloride, styrene, vinyltoluene, acrylonitrile, methacrylonitrile, acrylamide, methacrylamide, maleic acid and esters thereof, or one or more of the acrylic and methacrylic acid esters mentioned in U.S. Pat. Nos. 2,795,564 and 3,356,627, which polymers are well-known as the film-forming component of aqueous base paints; homopolymers of $C_2$–$C_{40}$ alpha olefins such as ethylene, isobutylene, octene, nonene, and styrene, and the like; copolymers of one or more of these hydrocarbons with one or more esters, nitriles or amides of acrylic acid or of methacrylic acid or with vinyl esters, such as vinyl acetate and vinyl chloride, or with vinylidene chloride; and diene polymers, such as copolymers of butadiene with one or more of styrene, vinyl toluene, acrylonitrile, methacrylonitrile, and esters of acrylic acid or methacrylic acid. It is also quite common to include a small amount, such as 0.5 to 2.5% or more, of an acid monomer in the monomer mixture used for making the copolymers mentioned above by emulsion polymerization. Acids used include acrylic, methacrylic, itaconic, aconitic, citraconic, crotonic, maleic, fumaric, the dimer of methacrylic acid, and so on.

The vinyl acetate copolymers are well-known and include copolymers such as vinyl acetate/butyl acrylate/2-ethylhexyl acrylate, vinyl acetate/butyl maleate, vinyl acetate/ethylene, vinyl acetate/vinyl chloride/butyl acrylate and vinyl acetate/vinyl chloride/ethylene. Throughout this specification the term "acrylic polymer" means any polymer wherein at least 50% by weight is an acrylic or methacrylic acid or ester, including mixtures of such acids and esters individually and together. The term "vinyl acetate polymer" means any polymer containing at least 50% by weight of vinyl acetate.

The aqueous polymer dispersions may be prepared according to well known procedures, using one or more emulsifiers of an anionic, cationic, or nonionic type. Mixtures of two or more emulsifiers regardless of type may be used, except that it is generally undesirable to mix a cationic with an anionic type in any appreciable amounts since they tend to neutralize each other. The amount of emulsifier may range from about 0.1 to 6% by weight or sometimes even more, based on the weight of the total monomer charge. When using a persulfate type of initiator, the addition of emulsifiers is often unnecessary. This omission or the use of only a small amount, e.g., less than about 0.5%, of emulsifier, may sometimes be desirable from a cost standpoint, and less sensitivity of the dried coating or impregnation to moisture, and hence less liability of the coated substrate to be affected by moisture. In general, the molecular weight of these emulsion polymers is high, e.g., from about 100,000 to 10,000,000 viscosity average, most commonly above 500,000.

The foregoing and other emulsion polymer systems which may be pigmented with the pigment dispersions of the invention are set forth in the extensive literature on the subject, such as U.S. Pat. Nos. 3,035,004; 2,795,564; 2,875,166; and 3,037,952, for example.

The pigment dispersion may be added to polymer latex systems at any time during the preparation thereof, including during or after polymerization or copolymerization and by single or multiple additions. Normally, from about 0.1% to about 10%, preferably 1–3%, by weight of pigment dispersion on polymer latex solids is adequate to provide suitable levels of pigmenting. However, the amount may be higher or lower depending on the particular system, other additives present, and similar reasons understood by the formulator.

This invention also relates to a method of coating a substrate comprising contacting a surface of a substrate with a composition comprising a latex paint binder and an inorganic pigment dispersion of this invention and drying said surface to form a film of said polymer in contact with said surface. Methods of coating substrates, e.g. roll coating and spray coating, are described in "Coating Methods", *Encyclopedia of Polymer Science and Engineering*, vol. 3, pp. 553–575 (John Wiley & Sons, Inc., New York, N.Y., 1985), the disclosure of which is incorporated herein by reference.

U.S. patent application Ser. No. (Case No. M5627 FPD/COAD), filed on even date herewith, relates to the use of copolymers of an aromatic monomer, e.g. styrene, and an acid monomer, e.g. acrylic acid, to disperse an inorganic pigment. U.S. patent application Ser. No. (Case No. M5684 FPD/COAD), filed on even date herewith, relates to the use of terpolymers of an aromatic monomer, e.g. styrene, an acid monomer, e.g. acrylic acid, and an amide monomer, e.g. acrylamide or N-methylol acrylamide, to disperse an inorganic pigment. The disclosures of these applications are incorporated herein by reference.

The following examples will serve to further illustrate the invention, but should not be construed to limit the invention, unless expressly set forth in the appended claims. All parts, percentages, and ratios are by weight unless otherwise indicated in context.

EXAMPLES

Example 1

A solution of 33.35% by weight of styrenated acrylic resin, available as G-CRYL 299 from Henkel Corp., Ambler, Pa., in an aqueous solution that also contained 8.3% by weight of 28% by weight aqueous ammonia was used in the general formulation set forth above. G-CRYL 299 is described as a 45% solids solution of styrenated acrylic resin having an acid number of 220, Tg of 65° C., a molecular weight of 5,200, and a softening point of 115° C. The properties of the paint film are set forth below.

Example 2

A solution of 31.77% by weight of styrenated acrylic resin, available as G-CRYL 399 from Henkel Corp., Ambler, Pa., in an aqueous solution that also contained 8.1% by weight of 28% by weight aqueous ammonia was used in the general formulation set forth above. G-CRYL 399 is described as a 40% solids solution of styrenated acrylic resin having an acid number of 215, Tg of 64° C., a molecular weight of 5,900, and a softening point of 125° C. The properties of the paint film are set forth below.

Example 3

A solution of 28.3% by weight of styrenated acrylic resin, available as G-CRYL 599 from Henkel Corp., Ambler, Pa., in an aqueous solution that also contained 7.2% by weight of 28% by weight aqueous ammonia was used in the general formulation set forth above. G-CRYL 599 is described as a 35% solids solution of styrenated acrylic resin having an acid number of 190, Tg of 80° C., a molecular weight of 9,500, and a softening point of 130° C. The properties of the paint film are set forth below.

Example 4

A solution of 23.8% by weight of styrenated acrylic resin, available as ACX-12-436 from Henkel Corp., Ambler, Pa., in an aqueous solution that also contained 7.2% by weight of 28% by weight aqueous ammonia was used in the general formulation set forth above. The properties of the paint film are set forth below.

Example 5

A solution of 30.7% by weight of styrenated acrylic resin, available as ACX-12-955 from Henkel Corp., Ambler, Pa., in an aqueous solution that contained less than 10% by weight of 28% aqueous ammonia was used in the general formulation set forth above. The properties of the paint film are set forth below.

Comparative Example 1 (100% Acrylic Acid Homopolymer)

Polyacrylic acid in its neutralized form was used as the dispersing polymer.

PIGMENT DISPERSION AND PAINT PREPARATION

An amount of dispersing polymer solution sufficient to yield 1% polymer solids per total pigment solids in the pigment dispersion was mixed with the following ingredients.

| Ingredients | Parts by Weight |
|---|---|
| Deionized water | 45.0 |
| Surfactant (Triton CF-10, Union Carbide) | 1.8 |
| Defoamer (Foamaster AP, Henkel) | 2.0 |
| Titanium dioxide pigment (TiPure R-900, DuPont) | 196.0 |

Grind above for 15–20 minutes using a high speed Dispermat CV Model D 5226. Fineness-of-Grind should be 6+, then add:
Styrene acrylic latex binder (Rhoplex HG-74, Rohm & Haas) 5430
Methyl carbitol (diethylene glycol methyl ether) 450
Texanol (2,2,4-trimethylpentanediol monoisobutyrate) 348
Defoamer (Foamaster AP) 2.0
Biocide(Dowicil 75 (20%), Dow Chemical) 8.0

Adjust resulting mixture to pH of 8.3–8.5 by adding sufficient 28% aqueous ammonium hydroxide. To the resulting mixture add a pre-mix of 4.9 parts by weight of a urethane rheology modifier, available as DSX 1514, Henkel Corporation, and 28.6 parts by weight of water. Then add 70.0 parts by weight of water to form a finished paint. Test paints are allowed to equilibrate 24 hours prior to testing.

Test paints are applied to aluminum Q-Panels having a mill finish 3003 (0.025"×3"×9" dimension). Paints are applied 6 mils wet using a wet film applicator. Coated panels are then allowed to air dry horizontally for 24 hours. After 24 hours of film dry time, the panels are placed (coated side facing inside the chamber) on the QCT Weatherometer. This test method is a modified version of ASTM D 4585 with an internal chamber temperature of 100° F. Panels are rated hourly for the first eight hours with the final rating taken at hour 24. ASTM D714 is used to rate both frequency and size of visible blisters. Prior to QCT testing, gloss values are taken using a BYK Gardner Micro TRI glossmeter.

PAINT FILM DATA

| Example | Paint Film Drying Time (Days) | Gloss (20°/60°) | Exposure Time (Hours) (ASTM-D-4582) | Film Quality After Exposure Time |
|---|---|---|---|---|
| 1 | 1 | 52/80 | 24 | no blisters |
| 2 | 1 | 50/79 | 24 | no blisters |
| 3 | 1 | 42/76 | 24 | no blisters |
| 4 | 1 | 42/75 | 24 | no blisters |
| 5 | 1 | 46/78 | 24 | no blisters |
| Comp. 1 | 1 | 16/57 | 24 | 2/Dense |

Size of Blisters: Pinpoint (pp) < B < 6 < 4 < 2
Frequency of Blisters: NB (no blisters) < Few < Medium < Medium Dense < Dense

What is claimed is:

1. A method of preparing an inorganic pigment dispersion useful in the preparation of latex paints, said method comprising dispersing an inorganic pigment in an aqueous medium further comprised of a dispersing polymer and ammonia or an organic amine in a quantity sufficient to solubilize the dispersing polymer, said dispersing polymer being derived from monomers consisting essentially of from about 10 to about 60% by weight of an ethylenically unsaturated aromatic monomer having an unsubstituted ethylenic group, from about 20 to about 70% by weight of an ethylenically unsaturated aromatic monomer having an alkyl-substituted ethylenic group, and from about 10 to about 60% by weight of an ethylenically unsaturated acid monomer, wherein the amount of said ethylenically unsaturated acid monomer is sufficient to permit said polymer to associate with an inorganic pigment in an aqueous medium in a manner which disperses said inorganic pigment in said aqueous medium to form a stable aqueous dispersion of said inorganic pigment, and wherein the total amount of said ethylenically unsaturated aromatic monomers is sufficient to reduce the water sensitivity of a dried coating of a latex paint comprised of said stable aqueous dispersion of said inorganic pigment.

2. A method as claimed in claim 1 wherein said aromatic monomer having an unsubstituted ethylenic group has the formula $CH_2=C(R^1)(R^2)$ wherein $R^1$ is an aromatic group having from 6 to 10 carbon atoms, and $R^2$ is hydrogen.

3. A method as claimed in claim 1 wherein said aromatic monomer having an unsubstituted ethylenic group is styrene.

4. A method as claimed in claim 1 wherein said aromatic monomer having an alkyl-substituted ethylenic group has the formula $CH_2=C(R^3)(R^4)$ wherein $R^3$ is an aromatic group having from 6 to 10 carbon atoms, and $R^4$ is lower alkyl.

5. A method as claimed in claim 4 wherein $R^4$ is $C_1$–$C_4$ alkyl.

6. A method as claimed in claim 4 wherein $R^4$ is methyl.

7. A method as claimed in claim 1 wherein said aromatic monomer having an alkyl-substituted ethylenic group is alpha-methylstyrene.

8. A method as claimed in claim 1 wherein said acid monomer has the formula $CH_2=C(C(O)OH)(R^5)$ wherein $R^5$ is hydrogen or methyl.

9. A method as claimed in claim 8 wherein said acid monomer is a mixture of compounds wherein $R^5$ is hydrogen and compounds wherein $R^5$ is methyl.

10. A method as claimed in claim 1 wherein said acid monomer is acrylic acid.

11. A method as claimed in claim 1 wherein from about 20% to about 40% of said monomers by weight based on the total weight of monomers are said aromatic monomer having an unsubstituted ethylenic group.

12. A method as claimed in claim 1 wherein from about 25% to about 35% of said monomers by weight based on the total weight of monomers are said aromatic monomer having an unsubstituted ethylenic group.

13. A method as claimed in claim 1 wherein from about 30% to about 50% of said monomers by weight based on the total weight of monomers are said aromatic monomer having an alkyl-substituted ethylenic group.

14. A method as claimed in claim 1 wherein from about 35% to about 45% of said monomers by weight based on the total weight of monomers are said aromatic monomer having an alkyl-substituted ethylenic group.

15. A method as claimed in claim 1 wherein from about 20% to about 40% of said monomers by weight based on the total weight of monomers are said acid monomer.

16. A method as claimed in claim 1 wherein from about 25% to about 35% of said monomers by weight based on the total weight of monomers are said acid monomer.

17. A method as claimed in claim 1 wherein said dispersing polymer has a weight average molecular weight of from about 1,000 to about 20,000.

18. A method as claimed in claim 1 wherein said dispersing polymer has a weight average molecular weight of from about 1,500 to about 10,000.

19. A method as claimed in claim 1 wherein said dispersing polymer has a weight average molecular weight of from about 2,000 to about 8,500.

20. A method as claimed in claim 1 wherein said dispersing polymer has an acid value of less than about 250.

21. A method as claimed in claim 1 wherein said dispersing polymer has an acid value of about 110 to about 240.

22. A method as claimed in claim 1 wherein said dispersing polymer has an acid value of from about 190 to about 220.

23. A method as claimed in claim 1 wherein said aqueous medium is essentially free of volatile organic solvents.

24. A method as claimed in claim 1 wherein the sum of the weights of said ethylenically unsaturated aromatic monomer having an unsubstituted ethylenic group, said ethylenically unsaturated aromatic monomer having an alkyl-substituted ethylenic group, and said ethylenically unsaturated acid monomer is at least 90% by weight of said monomers.

25. A method as claimed in claim 1 wherein said monomers consist of said ethylenically unsaturated aromatic monomer having an unsubstituted ethylenic group, said ethylenically unsaturated aromatic monomer having an alkyl-substituted ethylenic group, and said ethylenically unsaturated acid monomer.

26. A method as claimed in claim 1 wherein the weight ratio of said inorganic pigment to said aqueous medium is from about 1:1 to about 10:1.

27. A method as claimed in claim 1 wherein the weight ratio of said inorganic pigment to said aqueous medium is from about 1.5:1 to about 5:1.

28. A method as claimed in claim 1 wherein the weight ratio of said inorganic pigment to said aqueous medium is from about 2:1 to about 4:1.

29. A method as claimed in claim 1 wherein the weight ratio of said inorganic pigment to said dispersing polymer is from about 10:1 to about 1000:1.

30. A method as claimed in claim 1 wherein the weight ratio of said inorganic pigment to said dispersing polymer is from about 50:1 to about 500:1.

31. A method as claimed in claim 1 wherein the weight ratio of said inorganic pigment to said dispersing polymer is from about 75:1 to about 150:1.

32. A method as claimed in claim 1 wherein said inorganic pigment is a titanium dioxide pigment.

33. A method of preparing an inorganic pigment dispersion useful in the preparation of latex paints, said method comprising dispersing an inorganic pigment in an aqueous medium essentially free of volatile organic solvents and further comprised of a dispersing polymer and ammonia or an organic amine in a quantity sufficient to solubilize the dispersing polymer, said dispersing polymer being derived from monomers consisting essentially of:
   (i) from about 20% to about 40% by weight of an aromatic monomer having the formula $CH_2=C(R^1)(R^2)$ wherein $R^1$ is an aromatic group having from 6 to 10 carbon atoms, and $R^2$ is hydrogen,
   (ii) from about 30% to about 50% by weight an aromatic monomer having the formula $CH_2=C(R^3)(R^4)$ wherein $R^3$ is an aromatic group having from 6 to 10 carbon atoms, and $R^4$ is lower alkyl, and
   (iii) from about 20% to about 40% by weight an acid monomer having the formula $CH_2=C(C(O)OH)(R^5)$ wherein $R^5$ is hydrogen or methyl, or mixtures thereof, said dispersing polymer having a weight average molecular weight of from about 1,500 to about 10,000.

34. A method of preparing an inorganic pigment dispersion useful in the preparation of latex paints, said method comprising dispersing a titanium dioxide pigment in an aqueous medium essentially free of volatile organic solvents and further comprised of a dispersing polymer and ammonia or an organic amine in a quantity sufficient to solubilize the dispersing polymer, said dispersing polymer being derived from monomers consisting of from about 25% to about 35% by weight of styrene, from about 35% to about 45% by weight of alpha-methyl styrene, and from about 25% to about 35% by weight of acrylic acid, said polymer having a weight average molecular weight of from about 2,000 to about 8,500, wherein the weight ratio of said titanium dioxide pigment to said dispersing polymer is from about 50:1 to about 500:1.

35. An inorganic pigment dispersion comprising, in an aqueous medium being essentially free of volatile organic solvents, an inorganic pigment, a dispersing polymer, and ammonia or an organic amine in a quantity sufficient to solubilize the dispersing polymer, said dispersing polymer being derived from monomers consisting essentially of from about 10 to about 60% by weight of an ethylenically unsaturated aromatic monomer having an unsubstituted ethylenic group, from about 20 to bout 70% by weight of an ethylenically unsaturated aromatic monomer having an alkyl-substituted ethylenic group, and from about 10 to about 60% by weiht of an ethylenically unsaturated acid monomer, wherein the amount of said ethylenically unsaturated acid monomer is sufficient to permit said polymer to associate with an inorganic pigment in an aqueous medium in a manner which disperses said inorganic pigment in said aqueous medium to form a stable aqueous dispersion of said inorganic pigment, and wherein the total amount of said ethylenically unsaturated aromatic monomers is sufficient to reduce the water sensitivity of a dried coating of a latex paint comprised of said stable aqueous dispersion of said inorganic pigment.

36. A dispersion as claimed in claim 35 wherein said aromatic monomer having an unsubstituted ethylenic group has the formula $CH_2=C(R^1)(R^2)$ wherein $R^1$ is an aromatic group having from 6 to 10 carbon atoms, and $R^2$ is hydrogen.

37. A dispersion as claimed in claim 35 wherein said aromatic monomer having an unsubstituted ethylenic group is styrene.

38. A dispersion as claimed in claim 35 wherein said aromatic monomer having an alkyl-substituted ethylenic group has the formula $CH_2=C(R^3)(R^4)$ wherein $R^3$ is an aromatic group having from 6 to 10 carbon atoms, and $R^4$ is lower alkyl.

39. A dispersion as claimed in claim 38 wherein $R^4$ is $C_1$–$C_4$ alkyl.

40. A dispersion as claimed in claim 38 wherein $R^4$ is methyl.

41. A dispersion as claimed in claim 35 wherein said aromatic monomer having an alkyl-substituted ethylenic group is alpha-methylstyrene.

42. A dispersion as claimed in claim 35 wherein said acid monomer has the formula $CH_2=C(C(O)OH)(R^5)$ wherein $R^5$ is hydrogen or methyl.

43. A dispersion as claimed in claim 42 wherein said acid monomer is a mixture of compounds wherein $R^5$ is hydrogen and compounds wherein $R^5$ is methyl.

44. A dispersion as claimed in claim 35 wherein said acid monomer is acrylic acid.

45. A dispersion as claimed in claim 35 wherein from about 20% to about 40% of said monomers by weight based on the total weight of monomers are said aromatic monomer having an unsubstituted ethylenic group.

46. A dispersion as claimed in claim 35 wherein from about 25% to about 35% of said monomers by weight based on the total weight of monomers are said aromatic monomer having an unsubstituted ethylenic group.

47. A dispersion as claimed in claim 38 wherein from about 30% to about 50% of said monomers by weight based on the total weight of monomers are said aromatic monomer having an alkyl-substituted ethylenic group.

48. A dispersion as claimed in claim 35 wherein from about 35% to about 45% of said monomers by weight based on the total weight of monomers are said aromatic monomer having an alkyl-substituted ethylenic group.

49. A dispersion as claimed in claim 35 wherein from about 20% to about 40% of said monomers by weight based on the total weight of monomers are said acid monomer.

50. A dispersion as claimed in claim 35 wherein from about 25% to about 35% of said monomers by weight based on the total weight of monomers are said acid monomer.

51. A dispersion as claimed in claim 35 wherein said dispersing polymer has a weight average molecular weight of from about 1,000 to about 20,000.

52. A dispersion as claimed in claim 35 wherein said dispersing polymer has a weight average molecular weight of from about 1,500 to about 10,000.

53. A dispersion as claimed in claim 35 wherein said dispersing polymer has a weight average molecular weight of from about 2,000 to about 8,500.

54. A dispersion as claimed in claim 35 wherein said dispersing polymer has an acid value of less than about 250.

55. A dispersion as claimed in claim 35 wherein said dispersing polymer has an acid value of about 110 to about 240.

56. A dispersion as claimed in claim 35 wherein said dispersing polymer has an acid value of from about 190 to about 220.

57. A dispersion as claimed in claim 35 wherein the sum of the weights of said ethylenically unsaturated aromatic monomer having an unsubstituted ethylenic group, said ethylenically unsaturated aromatic monomer having an alkyl-substituted ethylenic group, and said ethylenically unsaturated acid monomer is at least 90% by weight of said monomers.

58. A dispersion as claimed in claim 35 wherein said monomers consist of said ethylenically unsaturated aromatic monomer having an unsubstituted ethylenic group, said ethylenically unsaturated aromatic monomer having an alkyl-substituted ethylenic group, and said ethylenically unsaturated acid monomer.

59. A dispersion as claimed in claim 35 wherein the weight ratio of said inorganic pigment to said aqueous medium is from about 1:1 to about 10:1.

60. A dispersion as claimed in claim 35 wherein the weight ratio of said inorganic pigment to said aqueous medium is from about 1.5:1 to about 5:1.

61. A dispersion as claimed in claim 35 wherein the weight ratio of said inorganic pigment to said aqueous medium is from about 2:1 to about 4:1.

62. A dispersion as claimed in claim 35 wherein the weight ratio of said inorganic pigment to said dispersing polymer is from about 10:1 to about 1000:1.

63. A dispersion as claimed in claim 35 wherein the weight ratio of said inorganic pigment to said dispersing polymer is from about 50:1 to about 500:1.

64. A dispersion as claimed in claim 35 wherein the weight ratio of said inorganic pigment to said dispersing polymer is from about 75:1 to about 150:1.

65. A dispersion as claimed in claim 35 wherein said inorganic pigment is a titanium dioxide pigment.

66. An inorganic pigment dispersion comprising, in an aqueous medium being essentially free of volatile organic solvents, an inorganic pigment, a dispersing polymer, and ammonia or an organic amine in a quantity sufficient to solubilize the dispersing polymer, said dispersing polymer being derived from monomers consisting essentially of:
  (i) from about 20% to about 40% by weight of an aromatic monomer having the formula $CH_2=C(R^1)(R^2)$ wherein $R^1$ is an aromatic group having from 6 to 10 carbon atoms, and $R^2$ is hydrogen,
  (ii) from about 30% to about 50% by weight an aromatic monomer having the formula $CH_2=C(R^3)(R^4)$ wherein $R^3$ is an aromatic group having from 6 to 10 carbon atoms, and $R^4$ is lower alkyl, and
  (iii) from about 20% to about 40% by weight an acid monomer having the formula $CH_2=C(C(O)OH)(R^5)$ wherein $R^5$ is hydrogen or methyl, or mixtures thereof, said dispersing polymer having a weight average molecular weight of from about 1,500 to about 10,000.

67. An inorganic pigment dispersion comprising a titanium dioxide pigment, an aqueous medium essentially free of volatile organic solvents, a dispersing polymer, and ammonia or an organic amine in a quantity suficient to solubilize the dispersing polymer, said dispersing polymer being derived from monomers consisting of from about 25% to about 35% by weight of styrene, from about 35% to about 45% by weight of alpha-methyl styrene, and from about 25% to about 35% by weight of acrylic acid, said polymer having a weight average molecular weight of from about 2,000 to about 8,500, wherein the weight ratio of said titanium dioxide pigment to said dispersing polymer is from about 50:1 to about 500:1.

68. A latex paint comprising a latex paint binder and inorganic pigment dispersion composition comprising, in an aqueous medium being essentially free of volatile organic solvents, an inorganic pigment, a dispersing polymer, and ammonia or an organic amine in a quantity sufficient to solubilize the dispersing polymer, said dispersing polymer being derived from monomers consisting essentially of from about 10 to about 60% by weight of an ethylenically unsaturated aromatic monomer having an unsubstituted ethylenic group, from about 20 to about 70% by weight of an ethylenically unsaturated aromatic monomer having an alkyl-substituted ethylenic group, and from about 10 to about 60% by weight of an ethylenically unsaturated acid monomer, wherein the amount of said ethylenically unsaturated acid monomer is sufficient to permit said polymer to associate with an inorganic pigment in an aqueous medium in a manner which disperses said inorganic pigment in said aqueous medium to form a stable aqueous dispersion of said inorganic pigment, and wherein the total amount of said ethylenically unsaturated aromatic monomers is sufficient to reduce the water sensitivity of a dried coating of a latex paint comprised of said stable aqueous dispersion of said inorganic pigment.

69. A method of coating a substrate comprising:
  contacting a surface of a substrate with a composition comprising a latex paint binder and an inorganic pigment dispersion comprising, in an aqueous medium being essentially free of volatile organic solvents, an inorganic pigment, a dispersing polymer and ammonia or an organic amine in a quantity sufficient to solubilize the dispersing polymer, said dispersing polymer being derived from monomers consisting essentially of from about 10 to about 60% by weight of an ethylenically unsaturated aromatic monomer having an unsubstituted ethylenic group, from about 20 to about 70% by weight of an ethylenically unsaturated aromatic monomer having an alkyl-substituted ethylenic group, and from about 10 to about 60% by weight of an ethylenically unsaturated acid monomer, wherein the amount of said ethylenically unsaturated acid monomer is sufficient to permit said polymer to associate with an inorganic pigment in an aqueous medium in a manner which disperses said inorganic pigment in said aqueous medium to form a stable aqueous dispersion of said inorganic pigment, and wherein the total amount of said ethylenically unsaturated aromatic monomers is sufficient to reduce the water sensitivity of a dried coating of a latex paint comprised of said stable aqueous dispersion of said inorganic pigment, and
  drying said surface to form a film of said composition in contact with said surface.

* * * * *